United States Patent
Holtby et al.

(10) Patent No.: US 9,488,295 B2
(45) Date of Patent: *Nov. 8, 2016

(54) LINE PIPE TRAY

(71) Applicant: Katch Kan Holdings Ltd., Edmonton (CA)

(72) Inventors: Quinn A. J. Holtby, Edmonton (CA); Dallas Laird Greenwood, Edmonton (CA)

(73) Assignee: Katch Kan Holdings Ltd., Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/556,857

(22) Filed: Dec. 1, 2014

(65) Prior Publication Data
US 2015/0144744 A1    May 28, 2015

Related U.S. Application Data

(63) Continuation of application No. 13/546,019, filed on Jul. 11, 2012, now Pat. No. 8,910,803.

(60) Provisional application No. 61/603,627, filed on Feb. 27, 2012.

(51) Int. Cl.
*F16L 3/02*    (2006.01)
*F16L 3/223*    (2006.01)
(Continued)

(52) U.S. Cl.
CPC ............... *F16L 3/02* (2013.01); *F16L 1/0246* (2013.01); *F16L 3/1218* (2013.01); *F16L 3/2235* (2013.01)

(58) Field of Classification Search
CPC ....... F16L 1/0246; F16L 3/02; F16L 3/1218; F16L 3/2235; B44D 3/126; B44D 3/128
USPC ............... 211/49.1, 60.1, 70.4, 126.12, 59.4, 211/126.7, 133.6, 126.1; 248/68.1, 49, 75, 248/80; 206/443, 391, 564, 446, 203; 220/571.1, 23.6, 669, 608, 661, 670, 220/672, 675, 676, 571, 570; 285/13; 15/257.05, 257.06; D32/53.1
See application file for complete search history.

(56) References Cited

U.S. PATENT DOCUMENTS

| | | | |
|---|---|---|---|
| 1,298,258 A | * | 3/1919 | Richards ......................... 285/13 |
| 1,531,569 A | | 3/1925 | Rade |

(Continued)

FOREIGN PATENT DOCUMENTS

| | | |
|---|---|---|
| CA | 86793 | 5/1999 |
| CA | 2166265 A1 | 6/2000 |

(Continued)

OTHER PUBLICATIONS

"PN#—4243 Valve Drain Tray," Central Alberta Plastic Products, Jul. 2, 2004, <http://web.archive.org/web/20040402140452/http://cappservice.com/valvetray.htm>, [retrieved Jan. 28, 2015], 2 pages.

(Continued)

*Primary Examiner* — Stanton L Krycinski
(74) *Attorney, Agent, or Firm* — Christensen O'Connor Johnson Kindness PLLC

(57) ABSTRACT

A line pipe tray for supporting a line pipe has outer sidewalls operatively coupled to outer end walls, inner sidewalls operatively coupled to the inner end walls, and a bottom surface extending between the inner sidewalls and the inner end walls to form a basin. The tray can further include pipe saddles on the top edges of the end walls and sidewalls. The tray can further include a pour lip on the end wall pipe saddles, and a recess on the end walls for receiving a pail or fluid container. Lifting handles disposed through the end walls can further include a tab for hooking onto a pail or fluid container to keep it from slipping away when the tray is lifted and tilted to pour fluids from the basin into the pail or fluid container.

3 Claims, 7 Drawing Sheets

(51) Int. Cl.
F16L 1/024 (2006.01)
F16L 3/12 (2006.01)

(56) References Cited

U.S. PATENT DOCUMENTS

| | | | |
|---|---|---|---|
| 1,858,101 A * | 5/1932 | McAfee | 248/49 |
| 2,314,835 A * | 3/1943 | Johns | A47J 47/18 206/514 |
| 2,849,027 A * | 8/1958 | Tetyak | 138/112 |
| D191,545 S | 10/1961 | Emery | |
| 3,026,076 A * | 3/1962 | Bender | 248/49 |
| 3,292,815 A | 12/1966 | Smith | |
| 3,333,727 A * | 8/1967 | Belcher et al. | 206/509 |
| 3,782,582 A * | 1/1974 | Lybbert et al. | 220/23.6 |
| 3,829,926 A | 8/1974 | Salladay | |
| D235,621 S | 7/1975 | Cawrse | |
| D237,920 S | 12/1975 | Bernard | |
| 3,993,192 A * | 11/1976 | Bunn | 206/515 |
| D249,233 S | 9/1978 | Florian | |
| 4,475,604 A | 10/1984 | Albertson | |
| 4,484,661 A | 11/1984 | Evenson | |
| 4,502,653 A * | 3/1985 | Curtis, Jr. | 248/55 |
| 4,513,934 A * | 4/1985 | Pruyne | 248/49 |
| 4,651,887 A | 3/1987 | Patrick | |
| 4,687,185 A * | 8/1987 | Urano et al. | 266/274 |
| 4,899,963 A * | 2/1990 | Murphy | 248/65 |
| 4,901,870 A * | 2/1990 | Wright et al. | 211/59.4 |
| D315,668 S * | 3/1991 | Murphy | D8/354 |
| 5,072,901 A * | 12/1991 | Scott | 248/49 |
| 5,107,654 A * | 4/1992 | Leonardis | 52/685 |
| 5,207,325 A * | 5/1993 | Kennedy | 206/370 |
| D363,662 S | 10/1995 | Plater | |
| D384,778 S | 10/1997 | Powers | |
| D389,307 S | 1/1998 | Zimmerman | |
| 5,729,949 A * | 3/1998 | Hartzheim | 52/677 |
| 5,775,869 A | 7/1998 | Bishop | |
| D399,727 S * | 10/1998 | Richter | D8/380 |
| 5,823,382 A | 10/1998 | Van Giezen | |
| D408,726 S * | 4/1999 | Vallee | D8/380 |
| D411,674 S * | 6/1999 | Haley et al. | D32/53 |
| 5,918,751 A * | 7/1999 | Kelly | 211/194 |
| 5,941,410 A * | 8/1999 | Mangano | 220/735 |
| 5,975,342 A * | 11/1999 | Bradeen et al. | 220/737 |
| D420,277 S * | 2/2000 | Burke et al. | D8/354 |
| 6,065,633 A * | 5/2000 | Abbey | 220/501 |
| 6,102,086 A | 8/2000 | Holtby | |
| 6,105,813 A * | 8/2000 | Abbey | 220/570 |
| 6,116,266 A | 9/2000 | Dickison | |
| D432,361 S | 10/2000 | Jenkins | |
| D436,522 S * | 1/2001 | Neider et al. | D8/380 |
| 6,250,591 B1 * | 6/2001 | Cunningham | 248/65 |
| 6,401,960 B1 * | 6/2002 | Hammett | 220/516 |
| 6,446,827 B1 | 9/2002 | Akins | |
| 6,520,456 B1 * | 2/2003 | Neider et al. | 248/49 |
| 6,648,281 B1 * | 11/2003 | Lake | 248/75 |
| D493,670 S | 8/2004 | De Neubourg | |
| 6,824,115 B1 * | 11/2004 | Batson | 248/238 |
| D500,243 S * | 12/2004 | Turek | D8/354 |
| 6,889,944 B2 * | 5/2005 | Brandzel et al. | 248/68.1 |
| 6,932,449 B2 * | 8/2005 | Collins et al. | 312/405.1 |
| 7,007,978 B1 * | 3/2006 | Purdom | 280/809 |
| D521,851 S * | 5/2006 | Smart | D8/354 |
| D525,820 S | 8/2006 | Öztiryaki | |
| D527,506 S * | 8/2006 | Camp et al. | D32/53 |
| D537,996 S * | 3/2007 | Lundy | D32/53.1 |
| D543,134 S | 5/2007 | Cox | |
| 7,278,613 B2 * | 10/2007 | Roy | 248/49 |
| D573,411 S | 7/2008 | Lovett | |
| 7,441,731 B2 * | 10/2008 | Smart et al. | 248/74.1 |
| 7,497,405 B2 * | 3/2009 | Huo | 248/68.1 |
| D600,113 S | 9/2009 | Edwards | |
| 7,607,619 B2 * | 10/2009 | Smart et al. | 248/74.1 |
| D604,920 S * | 11/2009 | Bergman | D32/53.1 |
| 7,637,387 B1 | 12/2009 | Cantolino | |
| 7,644,819 B2 * | 1/2010 | Gill et al. | 206/446 |
| 7,731,131 B2 | 6/2010 | Trueb | |
| 7,798,920 B1 * | 9/2010 | Cortes | 473/440 |
| 8,281,952 B2 | 10/2012 | Robellard | |
| 8,292,238 B2 * | 10/2012 | Wakeman et al. | 248/68.1 |
| 8,479,945 B1 | 7/2013 | Simmons | |
| 8,613,373 B2 | 12/2013 | Holtby | |
| 8,701,923 B2 | 4/2014 | Anhalt | |
| D715,623 S | 10/2014 | Holtby | |
| D718,610 S | 12/2014 | Holtby | |
| 8,910,803 B2 | 12/2014 | Holtby | |
| 2003/0089829 A1 * | 5/2003 | Brandzel et al. | 248/68.1 |
| 2006/0064843 A1 * | 3/2006 | Maria Cornelissen | 15/257.06 |
| 2006/0091265 A1 * | 5/2006 | Smart | 248/49 |
| 2006/0131469 A1 * | 6/2006 | Roy | 248/346.03 |
| 2008/0308556 A1 * | 12/2008 | Dale | 220/288 |
| 2009/0277913 A1 * | 11/2009 | Bergman | 220/570 |
| 2009/0302563 A1 * | 12/2009 | Thibault | 280/47.34 |
| 2011/0101000 A1 * | 5/2011 | Cutler et al. | 220/570 |
| 2012/0152961 A1 * | 6/2012 | DiBlasi et al. | 220/570 |

FOREIGN PATENT DOCUMENTS

| | | |
|---|---|---|
| CA | 102346 S | 2/2004 |
| CA | 128113 S | 9/2009 |
| CA | 144032 | 10/2012 |
| CA | 2 777 704 C | 8/2014 |
| WO | 2013/126983 A1 | 9/2013 |

OTHER PUBLICATIONS

"PN# 4281—Line Pipe Tray," Central Alberta Plastic Products, Feb. 12, 2005, <http://web.archive.org/web/20050212185439/http://cappservice.com/linepipetray.shtml>, [retrieved Jan. 28, 2015], 2 pages Photo of a Hobblestone line pipe tray, at least as early as Nov. 29, 2007, 1 page.

Photo of a Paddle Plastics line pipe tray, at least as early as Nov. 29, 2007, 1 page.

Excerpts from a Katch Kan brochure, Katch Kan Ltd., Edmonton, Alberta, Canada, at least as early as Dec. 31, 2007, 1 page.

"Katch Kan Drip Trays," Katch Kan Ltd., Edmonton, Alberta, Canada, at least as early as Sep. 30, 2009, 2 pages.

"Well Servicing ZSS™ Solution," Katch Kan Ltd., Edmonton, Alberta, Canada, at least as early as Feb. 1, 2013, 1 page.

"ZSS™ Advantage," Katch Kan Ltd., Edmonton, Alberta, Canada, at least as early as Feb. 1, 2013, 1 page.

"3 More Innovative Ideas from Katch Kan Enterprises Ltd.," Katch Kan Enterprises Ltd., Edmonton, Alberta, Canada, at least as early as Apr. 30, 2013, 3 pages.

Photos of line pipe trays, at least as early as Apr. 30, 2013, 16 pages.

"Rotational Molding," BROCH#100, Central Alberta Plastic Products, Edmonton, Alberta, Canada, at least as early as Apr. 30, 2013, 2 pages.

"Central Alberta Plastic Products," Central Alberta Plastic Products, Edmonton, Alberta, Canada, May 30, 2013, <https://web/archive/org/web/20130530092216/http://cappservice.com/>, [retrieved Nov. 12, 2015], 2 pages.

*Zero Spill Systems (Int'l) Inc.* v. *614248 Alberta Ltd.* (Lea-Der Coatings), 2013 FC 616.

"PN# 4281—Line Pipe Tray," Central Alberta Plastic Products, Edmonton, Alberta, Canada, Apr. 29, 2015, <http://www.cappservice.com/linepipetray.html>, 2 pages.

"Doghouse Poster v1.12-11," Katch Kan Ltd., Edmonton, Alberta, Canada, at least as early as May 13, 2015, 2 pages.

* cited by examiner

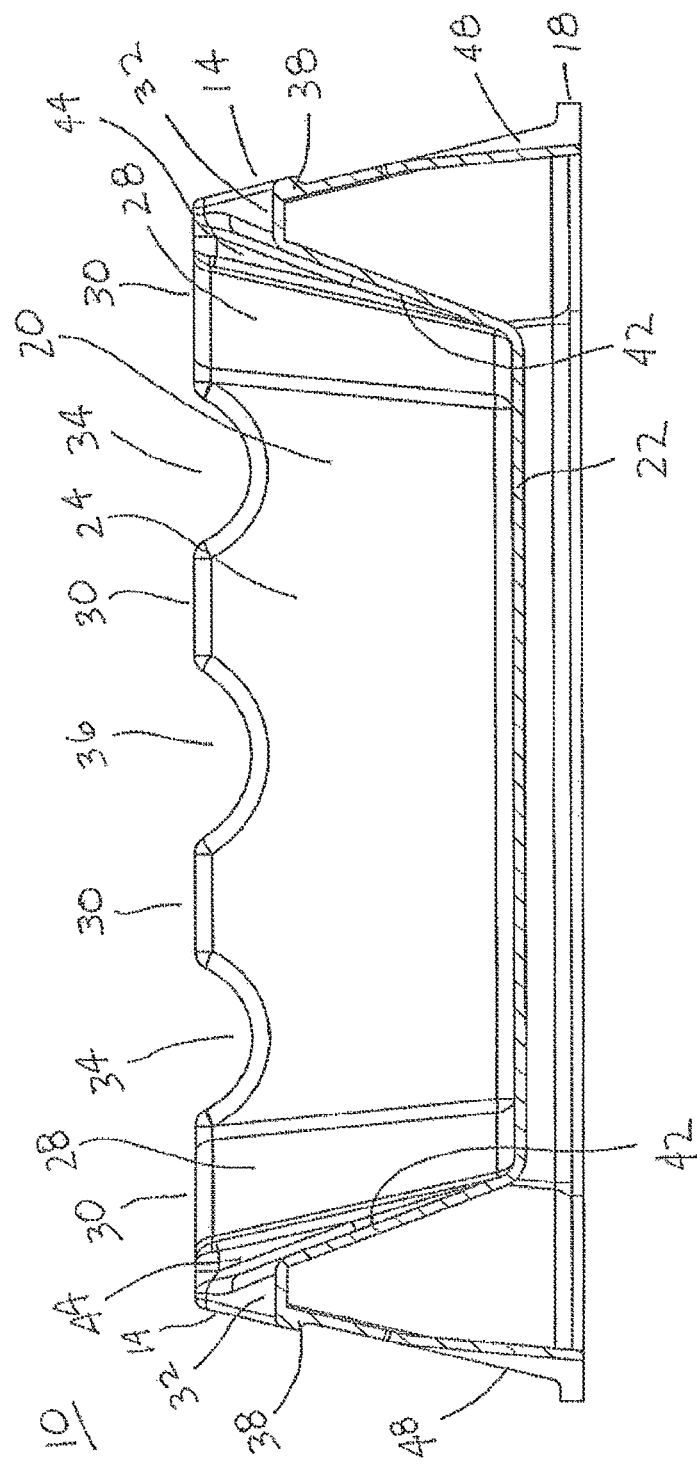

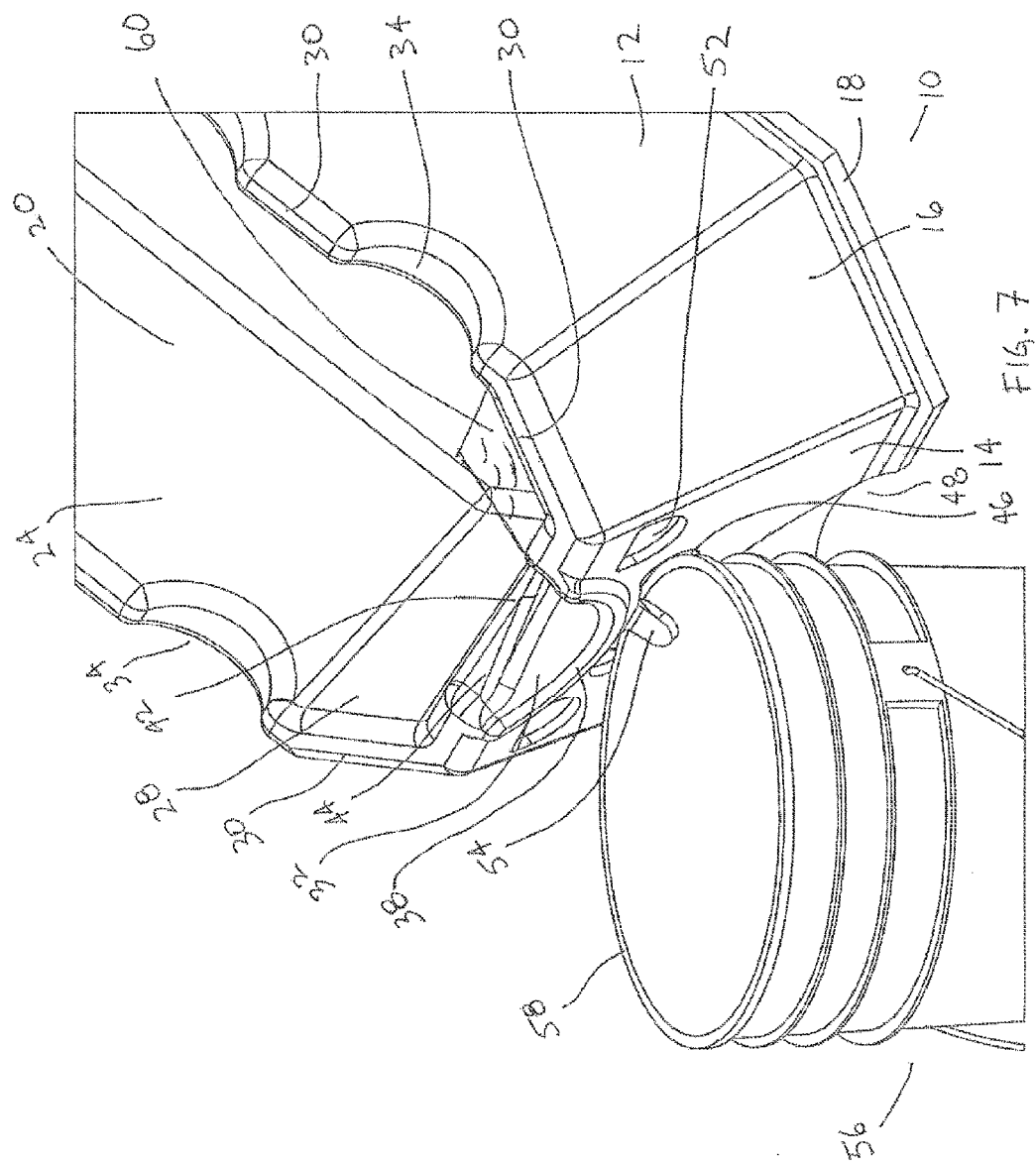

LINE PIPE TRAY

CROSS-REFERENCE TO RELATED APPLICATIONS

This application is a continuation of U.S. patent application Ser. No. 13/546,019 filed Jul. 11, 2012, issued as U.S. Pat. No. 8,910,803 B2, which claims the benefit of U.S. Provisional Application No. 61/603,627, entitled "Line Pipe Tray" filed Feb. 27, 2012, and hereby incorporates the same by reference herein in their entirety.

TECHNICAL FIELD

The present disclosure is related to the field of trays used to support pipe, in particular, trays used to support line pipe to or from a producing well, and that further comprise a basin for catching fluids that can spill from a union joint on the pipe.

BACKGROUND

Line pipe trays are known. They are typically rectangular in structure, when viewed from the top, and can comprise upstanding walls on each side, forming a basin therebetween and therein. They can further comprise saddles disposed on an upper edge on the upstanding walls to cradle line pipe lying thereon. Such line pipe trays are designed to support a singular size of pipe. The line pipe can be used to carry produced substances from a well, or to carry fluids or gases, such as steam, to a well in aid of operations being conducted on the well, as well known to those skilled in the art.

Typically, line pipe trays can be placed on the ground underneath union joints between adjoining pieces of line pipe to support the pipe off of the ground. When a union joint between adjoining pieces of line pipe is uncoupled, any fluids in the pipe can flow out of the ends of the pipe. By having a line pipe tray beneath a union joint, the tray can catch the released fluids. The captured fluids can then be dumped from the tray into another container or storage device for reuse, recycling or disposal, as required.

Current designs of line pipe trays can be flimsy and not structurally sturdy to withstand the weight of the pipe they support or the fluids captured and/or may be physically difficult to handle or move so as to pour the fluids in the basin of the tray to another container.

It is, therefore, desirable to provide a line pipe tray that overcomes the shortcomings of prior art designs of line pipe trays.

SUMMARY

Broadly stated, in some embodiments, a line pipe tray for supporting a line pipe is provided, the line pipe tray comprising a pair of outer sidewalls each having bottom edges and top edges, the outer sidewalls being tilted towards each other wherein the distance between the bottom edges thereof is larger than the distance between the top edges thereof; a pair of outer end walls each having bottom edges and top edges, the outer end walls being tilted towards each other wherein the distance between the bottom edges thereof is larger than the distance between the top edges thereof, the outer end walls being operatively coupled to the outer sidewalls; a pair of inner sidewalls each having bottom edges and top edges, said top edges intersecting with, and operatively coupled to, the top edges of the outer sidewalls thereby forming a pair of sidewall top edges; a pair of inner end walls each having bottom edges and top edges, said top edges intersecting with, and operatively coupled to, the top edges of the outer end walls thereby forming a pair of end wall top edges, the inner end walls being operatively coupled to the inner sidewalls; and a bottom surface disposed between and operatively coupled to the bottom edges of the inner sidewalls and the inner end walls, wherein a basin is formed therebetween. A pipe saddle may be disposed on each of the end wall top edges.

Broadly stated, in some embodiments, the line pipe tray can further comprise a plurality of outer corner walls each having bottom edges and top edges, the outer corner walls operatively coupling the outer sidewalls to the outer end walls; and a plurality of inner corner walls each having bottom edges and top edges, said top edges intersecting with, and operatively coupled to, the top edges of the outer corner walls thereby forming corner wall top edges, the inner corner walls operatively coupling the inner sidewalls to the inner end walls.

Broadly stated, in some embodiments, the line pipe tray can further comprise a pair of end wall pipe saddles, each end wall pipe saddle disposed on the end wall top edges.

Broadly stated, in some embodiments, at least one of the end pipe saddles can further comprise a pour lip, the pour lip extending outwardly from the outer end wall.

Broadly stated, in some embodiments, the line pipe tray can further comprise a plurality of outer pipe saddles, each outer pipe saddle disposed on the sidewall top edges nearer the outer end walls.

Broadly stated, in some embodiments, the line pipe tray can further comprise a pair of middle pipe saddles, each middle pipe saddle disposed on the sidewall top edges between the outer pipe saddles.

Broadly stated, in some embodiments, at least one of the inner end walls can further comprise a pour channel disposed thereon.

Broadly stated, in some embodiments, the line pipe tray can further comprise a recess disposed on one or both of the outer end walls for a pail or fluid container.

Broadly stated, in some embodiments, the line pipe tray can further comprise a first lifting handle disposed through one or both of the outer end walls.

Broadly stated, in some embodiments, the line pipe tray can further comprise a tab disposed on the outer end wall extending into the first lifting handle for hooking onto a pail or fluid container.

Broadly stated, in some embodiments, the line pipe tray can further comprise one or more second lifting handles disposed through one or both of the outer end walls.

Broadly stated, in some embodiments, the line pipe tray can further comprise a traction rib disposed along the bottom edges of the outer sidewalls and the outer end walls.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 6 is a cross-section elevation view depicting the line pipe tray of FIG. 4 along section line A-A; and FIG. 7 is a perspective view depicting the line pipe tray of FIG. 1 filled with fluid being poured into a pail.

DETAILED DESCRIPTION OF EMBODIMENTS

Figure 1:
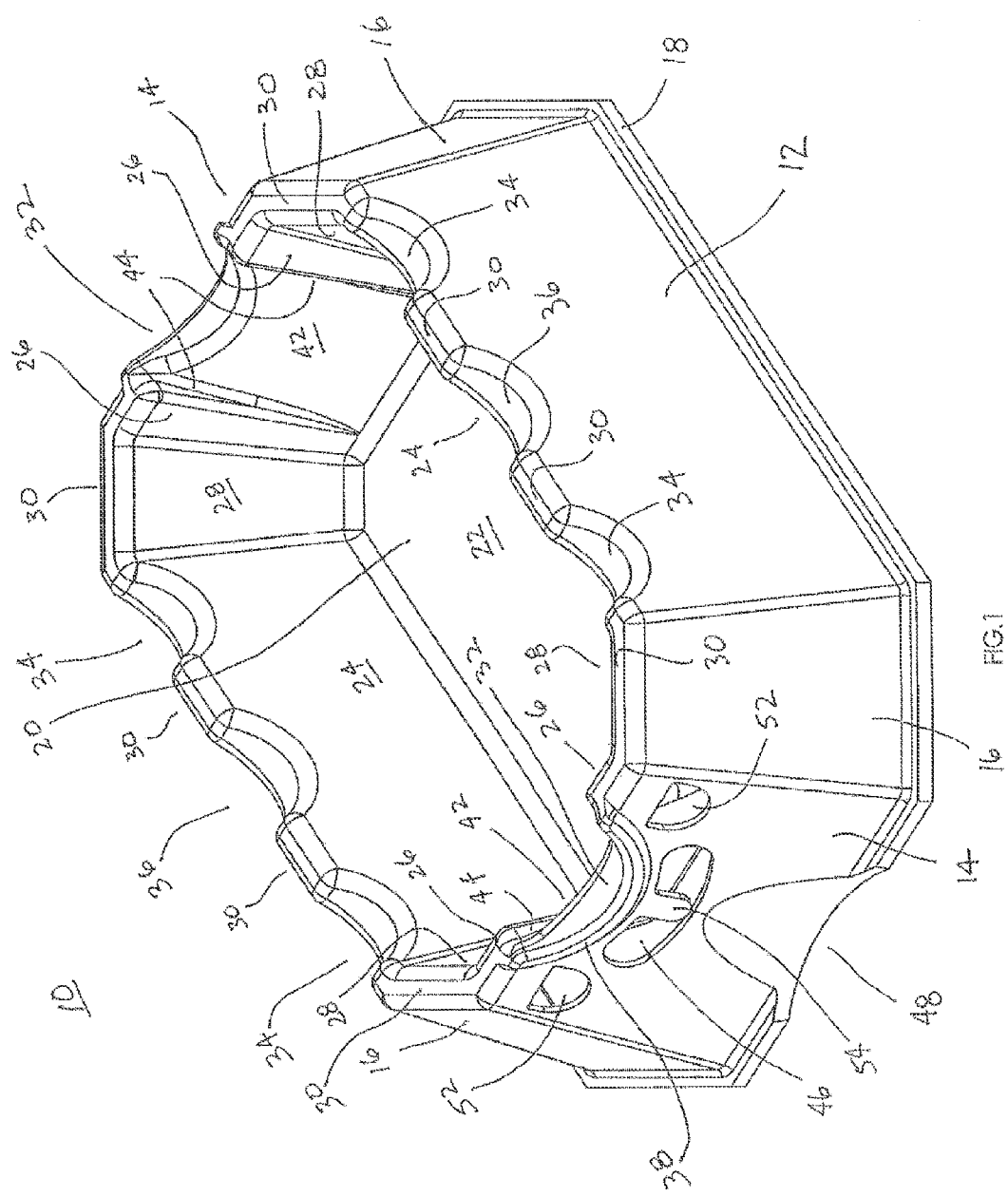
FIG. 1 is a perspective view depicting a line pipe tray.
Figure 2:
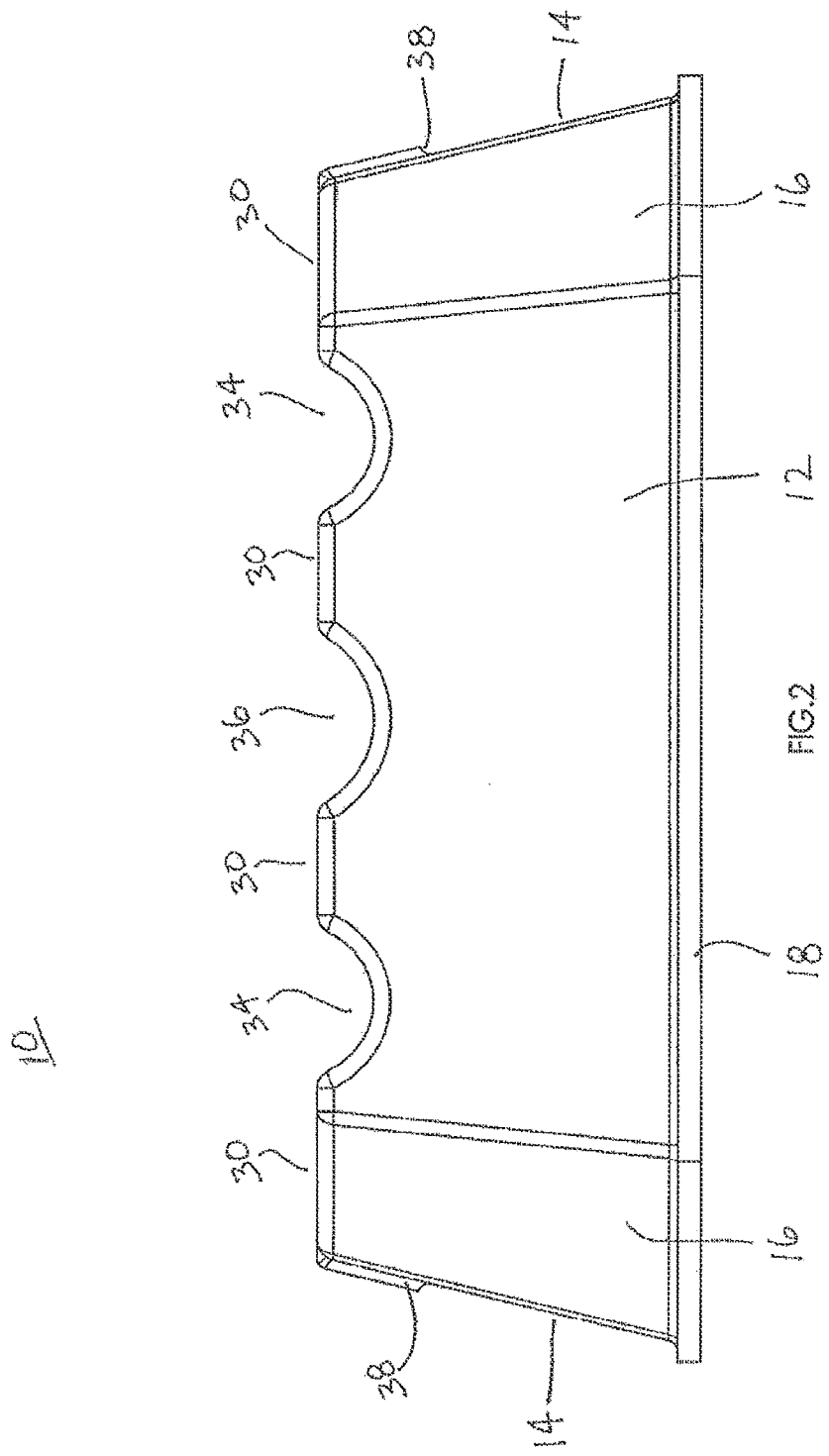
FIG. 2 is a side elevation view depicting the line pipe tray of FIG. 1.
Figure 3:
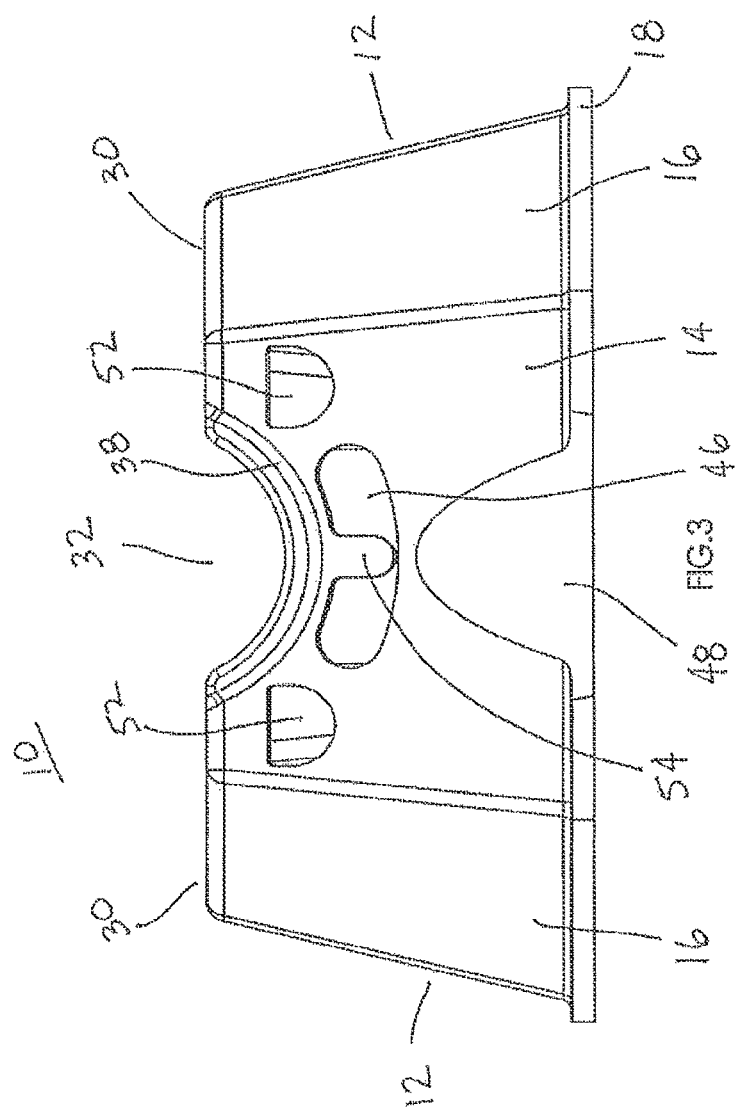
FIG. 3 is an end elevation view depicting the line pipe tray of FIG. 1.
Figure 4:
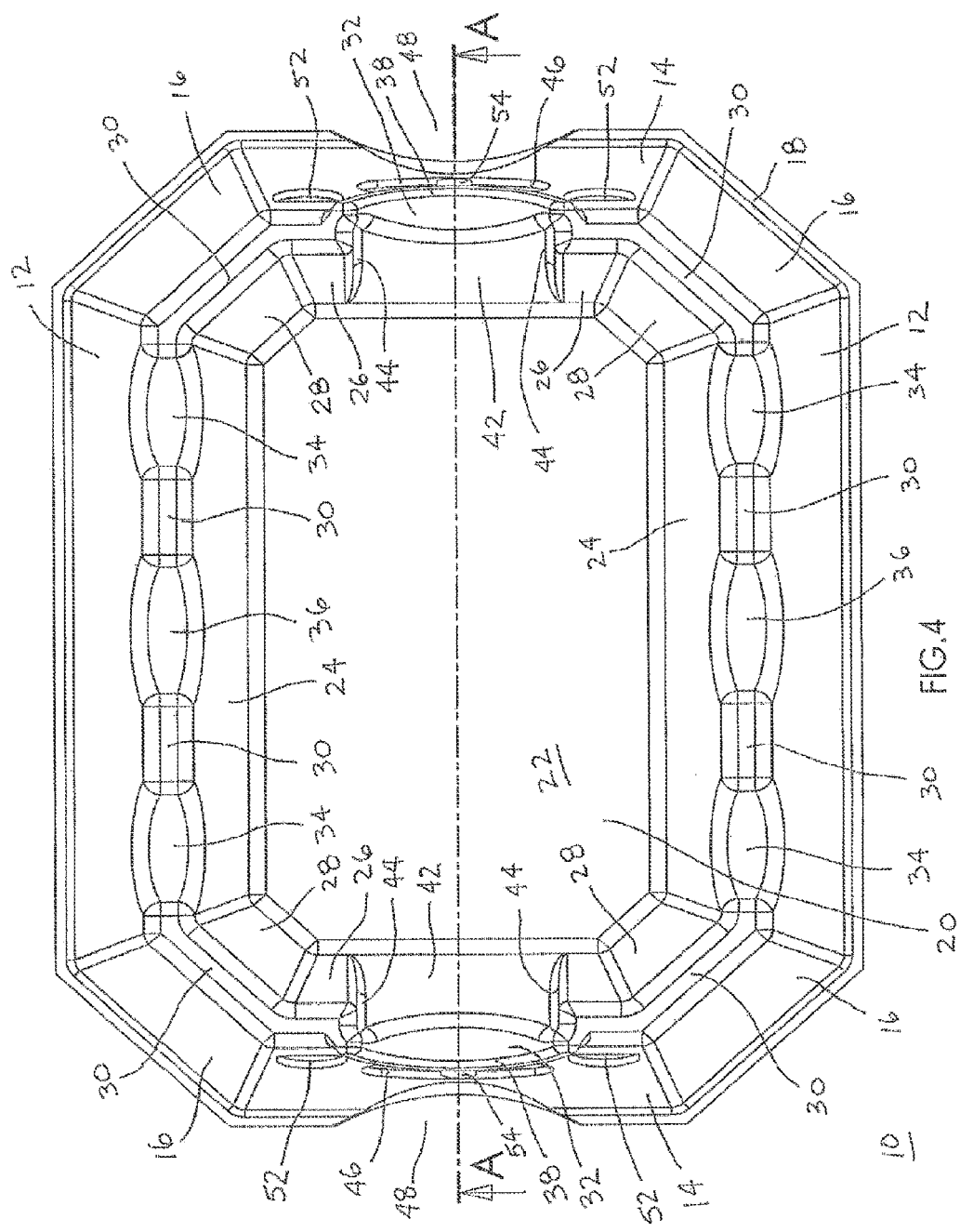
FIG. 4 is a top plan view depicting the line pipe tray of FIG. 1.
Figure 5:
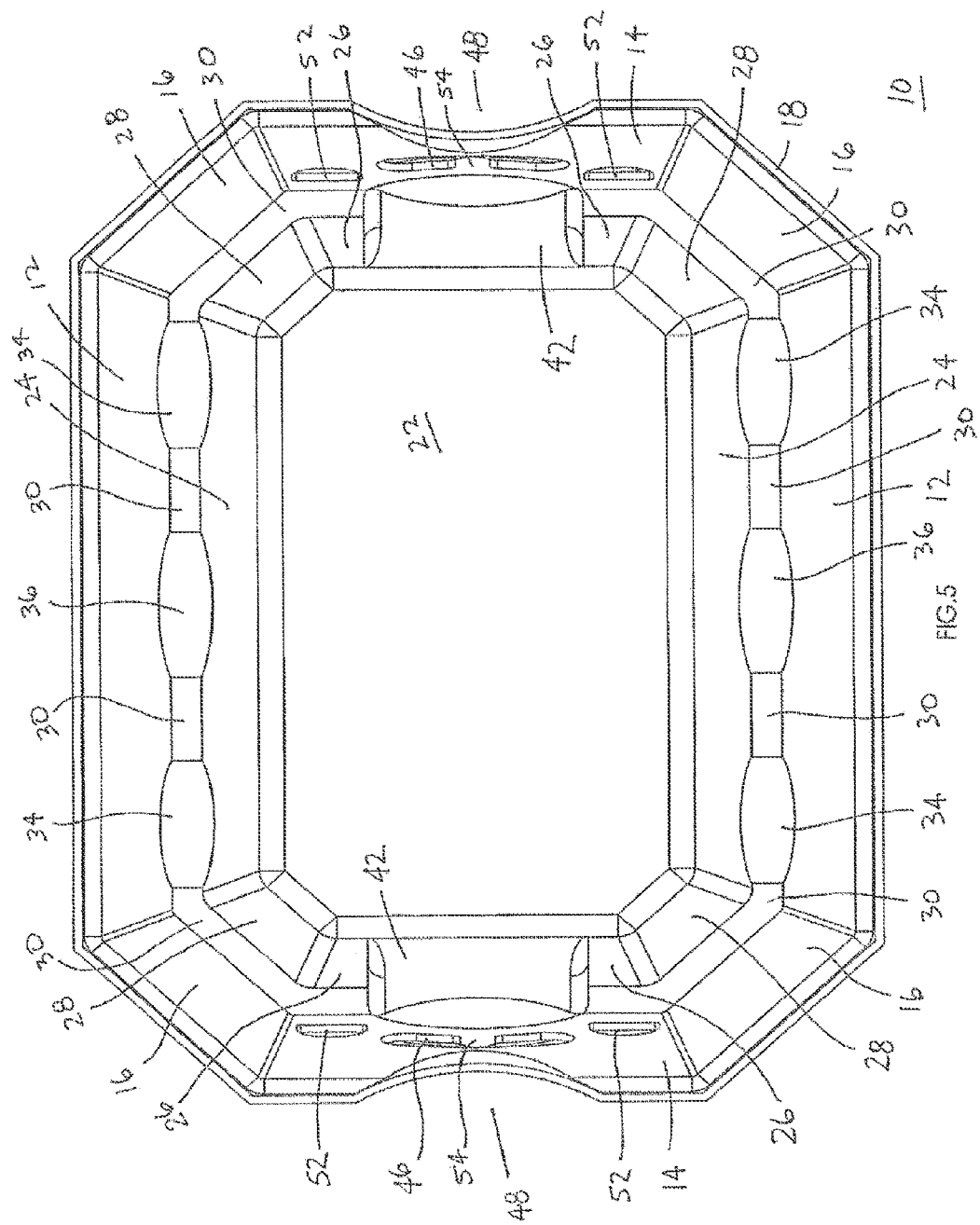
FIG. 5 is a bottom plan view depicting the line pipe tray of FIG. 1.

An improved line pipe tray is provided. Referring to FIGS. 1 to 6, an embodiment of line pipe tray 10 is shown. In some embodiments, line pipe tray 10 can comprise substantially parallel opposing outer sidewalls 12 and substantially parallel opposing end walls 14, and complimentary inner sidewalls 20 and inner end walls 26 that can intersect and adjoin outer sidewalls 12 and outer end walls 14 along top edge 30. In some embodiments, line pipe tray 10 can comprise traction rib 18 disposed therearound along a lower edge of outer sidewalls 12 and outer end walls 14 to provide stability and structural strength to line pipe tray 10, and to provide grip or traction in multiple types of ground conditions such as ice, snow, mud, dirt, grass and gravel. In some embodiments, outer sidewalls 12 and outer end walls 14 can taper inwardly towards each other from traction rib 18 to top edge 30, to provide additional stability and structural strength to line pipe tray 10.

In some embodiments, line pipe tray 10 can further comprise outer corner walls 16 operatively coupling outer sidewalls 12 to outer end walls 14, and inner corner walls 28 operatively coupling inner sidewalls 24 to inner end walls 26, wherein outer corner walls 16 and inner corner walls 28 intersect and adjoin along top edge 30. In further embodiments, traction rib 18 can extend along a lower edge of outer corner walls 16, and outer walls 16 can taper inwardly from traction rib 18 to top edge 30. In some embodiments, outer walls 16 provide chamfered corners to line pipe tray 10, at approximately 135 degrees relative to both of outer sidewalls 12 and outer end walls 14, to provide additional stability and structural strength to line pipe tray 10.

In some embodiments, line pipe tray 10 can comprise substantially planar bottom surface 22 extending between inner sidewalls 24, inner end walls 26 and inner corner walls 28 to form basin 20 therebetween. In some embodiments, line pipe tray 10 can further comprise pour channel 42 disposed on one or both of inner end walls 26 tapering outwardly from bottom surface 22 to top edge 30, thereby forming channel edges 44 disposed between end walls 26 and pour channel 42. In some embodiments, pour channel 42 can be configured or tapered for pouring fluids of high viscosity. In some embodiments, pour channel 42 can be configured or tapered for pouring fluids of low viscosity.

In some embodiments, line pipe tray 10 can comprise pipe saddles 32 disposed on outer and inner end walls 14 and 26 along top edge 30. In some embodiments, one or both pipe saddles 32 can further comprise pour lip 38 that can intersect with pour channel 42 wherein pour lip 38 can be configured to rest upon, and pour into, a secondary fluid container, such as a pail, when fluids are poured out of basin 20 along pour channel 42. In some embodiments, pipe saddles 32 can be configured to support the weight of 6.5 inch heavy gauge pipe or lower.

In some embodiments, line pipe tray 10 can comprise outer pipe saddles 34 disposed on opposing outer and inner sidewalls 12 and 24 along top edge 30. In some embodiments, outer pipe saddles 34 can be configured to support the weight of 4 inch heavy gauge pipe or lower. In some embodiments, line pipe tray can further comprise middle pipe saddles 36 disposed on opposing outer and inner sidewalls 12 and 24 along top edge 30, and disposed between outer pipe saddles 34. In some embodiments, middle pipe saddles can be configured to support the weight of 5 inch heavy gauge pipe or lower.

In some embodiments, line pipe tray 10 can comprise one or more lifting holes or handles 52 disposed through one or both of outer end walls 14, as shown in FIGS. 1, 3, 4 and 5 that allow personnel to lift and/or move line pipe tray 10. In some embodiments, lifting holes 52 can be d-shaped in configuration although it is obvious to those skilled in the art that lifting holes 52 can comprise any suitable shape for lifting. In some embodiments, line pipe tray 10 can comprise lifting hole or handle 46 disposed through one or both of outer end walls 14. In some embodiments, lifting handle 46 can be disposed between lifting handles 52.

In some embodiments, line pipe tray 10 can comprise recess 48 disposed on one or both of outer end walls 14. Recess 48 can be a concave depression formed on outer end wall 14 to allow line pipe tray 10 to be placed immediately beside a fluid container or pail prior to pouring fluids from basin 20. In some embodiments, lifting handle 46 can be arc-shaped, and can further comprise tab 54 disposed therein, wherein tab 54 can be used to hook onto a container or pail to prevent the pail from sliding away from line pipe tray 10 when it is lifted and tilted to pour fluids from basin 20 into the pail. Referring to FIG. 7, line pipe tray 10 is shown in a lifted and tilted position relative to pail 56 to pour fluids 60 from basin 20 into pail 56. Lip 58 of pail 56 is inserted into lifting handle 46, and pail tab 54 is shown hooked onto lip 58 to prevent pail 56 from sliding away from line pipe tray 10 as fluids 60 are being poured over pour lip 38 into pail 56.

In some embodiments, line pipe tray 10 can be comprised of high molecular weight plastic, which can be more resistant to ultra-violet light and can further allow line pipe tray 10 to last longer in outdoor conditions than other types of plastic, and can provide better flexibility. In some embodiments, line pipe tray 10 can be comprised of carbon fibre, fibreglass, composite materials or a combination of any or all of the materials disclosed herein.

In some embodiments, line pipe tray 10 can be manufactured using rotational plastic manufacturing techniques, as well known to those skilled in the art. In some embodiments, line pipe tray 10 can be further configured such that multiple line pipe trays 10 can be stacked together when not in use.

Although a few embodiments have been shown and described, it will be appreciated by those skilled in the art that various changes and modifications might be made without departing from the scope of the invention. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:

1. A line pipe tray for supporting a line pipe, the line pipe tray comprising:
    a basin formed from a bottom surface disposed between and operatively coupled to a plurality of walls that include a first pair of walls and a second pair of walls;
    a first pair of pipe saddles with each saddle disposed on respective walls of the first pair of walls; and
    a first pour channel disposed on a wall of the plurality of walls with a tab that forms a hook extending outwardly on the wall below the first pour channel for hooking onto a container or pail to prevent the container or pail from sliding away when the line pipe tray is lifted and tilted to pour fluids from the line pipe tray into the container or pail, wherein the plurality of walls comprise outer walls having bottom edges and top edges, the outer walls tilted towards each other, wherein the distance between the bottom edges thereof is larger than the distance between the top edges thereof, and inner walls having bottom edges and top edges, said top edges intersecting with and operatively coupled to the top edges of the outer walls, thereby forming wall top edges, wherein the bottom surface is disposed between and operatively coupled to the bottom edges of the inner walls; and further comprising at least a first lifting handle disposed through any one of the outer walls, wherein the tab extends into the first lifting handle.

2. A line pipe tray for supporting a line pipe, the line pipe tray comprising:
- a basin formed from a bottom surface disposed between and operatively coupled to a plurality of walls that include a first pair of walls and a second pair of walls;
- a first pair of pipe saddles with each saddle disposed on respective walls of the first pair of walls; and
- a first pour channel disposed on a wall of the plurality of walls with a tab that forms a hook extending outwardly on the wall below the first pour channel for hooking onto a container or pail to prevent the container or pail from sliding away when the line pipe tray is lifted and tilted to pour fluids from the line pipe tray into the container or pail, wherein the tab extends from an arc-shaped opening disposed in the corresponding wall.

3. The line pipe tray of claim 2, in which the arc-shaped opening has a concave lower edge shaped to fit a curved wall of the container or pail.

* * * * *